United States Statutory Invention Registration [19]

[11] Reg. Number: H435

Jenkins et al. [43] Published: Feb. 2, 1988

[54] ACOUSTIC SOURCE

[76] Inventors: Philip J. Jenkins, 14906 Piper Rd., Pearland, Tex.; Gary Hanes, P.O. Box 815972, Dallas, Tex. 75381

[21] Appl. No.: 910,779

[22] Filed: Sep. 17, 1986

[51] Int. Cl.[4] ..... G01V 1/04; G01V 1/38

[52] U.S. Cl. ..... 367/144; 367/146; 181/120

[58] Field of Search ..... 181/118, 112; 367/144, 367/146

*Primary Examiner*—Deborah L. Kyle
*Assistant Examiner*—Brian S. Steinberger

[57] ABSTRACT

An acoustic source is provided where a high pressure fluid is used to positively control the period an exhaust valve is open. High pressure fluid is introduced to the control chamber at a predetermined instant after the exhaust valve or shuttle has been opened. This results in conservation of air used to fire the acoustic source and also to achieve a desired signature.

5 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ACOUSTIC SOURCE

BACKGROUND OF THE INVENTION

1. Field of the Invention

This invention relates to acoustic sources and particularly to a source having a positively-controlled valve.

2. Discussion of the Related Art

In exploring of the subsurface of the earth, air guns and/or water guns may be used in a body of water to generate an acoustic pulse. The acoustic pulse propagates through the water and into the earth and is reflected from subsurface layers or other objects beneath the water surface and returned where they are detected by a series of sensitive sensors. Each sensor converts the reflected acoustic pulse to either analog or optical signals which may be transmitted to a remote recording and processing device mounted in an attendant ship.

An air gun typically used in seismic exploration generally consists of a housing having a cylindrical valve or shuttle disposed therein to define a firing chamber and a control chamber. The valve separates the control chamber from the firing chamber and closes exhaust ports extending through the housing. The surface area of the valve exposed in the control chamber is greater than the surface area of the opposite end of the valve exposed to the firing chamber, thus a lower pressure in the control chamber offsets a higher pressure in the firing chamber in keeping the shuttle closed. A slight decrease in the control-chamber pressure allowing the pressurized fluid in the firing chamber to open the shuttle and to exit through the now opened exhaust ports. The opening of the shuttle decreases the volume in the control chamber. The decrease in volume may compress any remaining fluid in the control chamber hopefully causing the shuttle valve to rebound and close.

A major disadvantage in using this method to control the closing of the shuttle is the residual fluid compressed in the control chamber by the shuttle may not be adequate to drive the shuttle in the opposite direction to close thus leaving the valve open and allowing water to flow into the firing chamber.

A second disadvantage may be that the shuttle rebounds several times from the closed position before completely closing, resulting in a longer recycling time between firings.

SUMMARY OF THE INVENTION

It is an object of this invention to provide a more efficient and reliable acoustic source.

It is another object of this invention to provide an acoustic source where the valve is positively controlled to open and close.

It is another object of this invention to conserve the use of compressant.

It is yet another object of this invention to provide a means for varying the acoustic signal produced by an acoustic source.

In accordance with the objects of this invention, an acoustic source is provided with a control chamber which receives a predetermined charge of high pressure fluid when the valve is opened. The high pressure fluid drives the valve in the opposite direction and provides positive control in the amount of time the shuttle valve is open.

BRIEF DESCRIPTION OF THE DRAWINGS

A better understanding of the benefits and advantages of my invention may be obtained from the appended detailed description and the drawings, wherein.

DETAILED DESCRIPTION OF A PREFERRED EMBODIMENT

Figure 1:
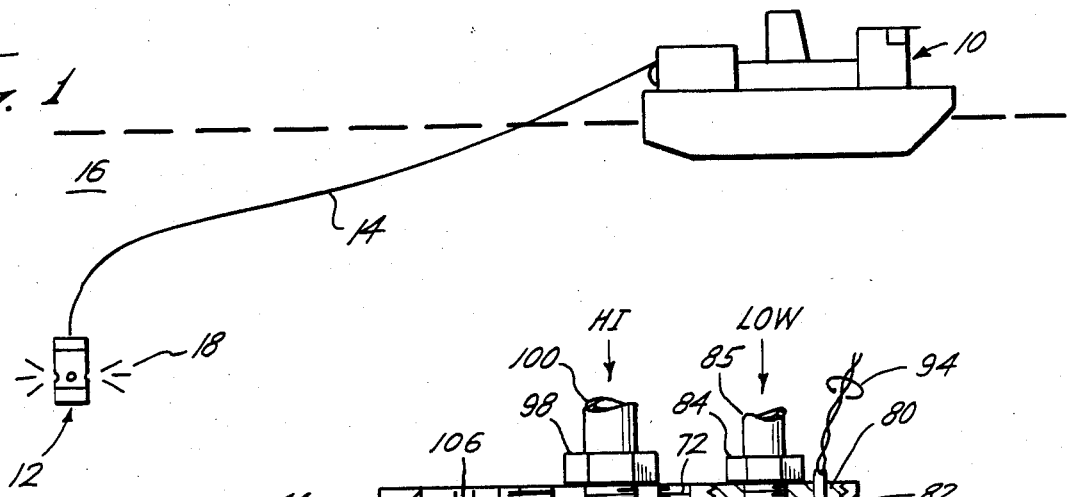
FIG. 1 is a general side view of a ship towing an acoustic source through a body of water.

FIG. 1 generally illustrates a ship 10 towing an acoustic source 12 attached at an end of a hose bundle 14 through a body of water 16. At predetermined intervals such as every 10 seconds, the acoustic source 12 generates an acoustic pulse produced by releasing high pressure fluid 18 into the water. Each acoustic pulse produces an acoustic wave front which propagates as an acoustic wave front through the water. The downward propagating portion of the acoustic wave front may be reflected from subsurface formations in the earth and returned to the water surface where they are detected by sensors such as hydrophones deployed in the water. The detected signals may be converted to electrical or optical signals and transmitted to a remote recording unit associated with the ship 10 through suitable conductors or telemetric system.

Figure 2:
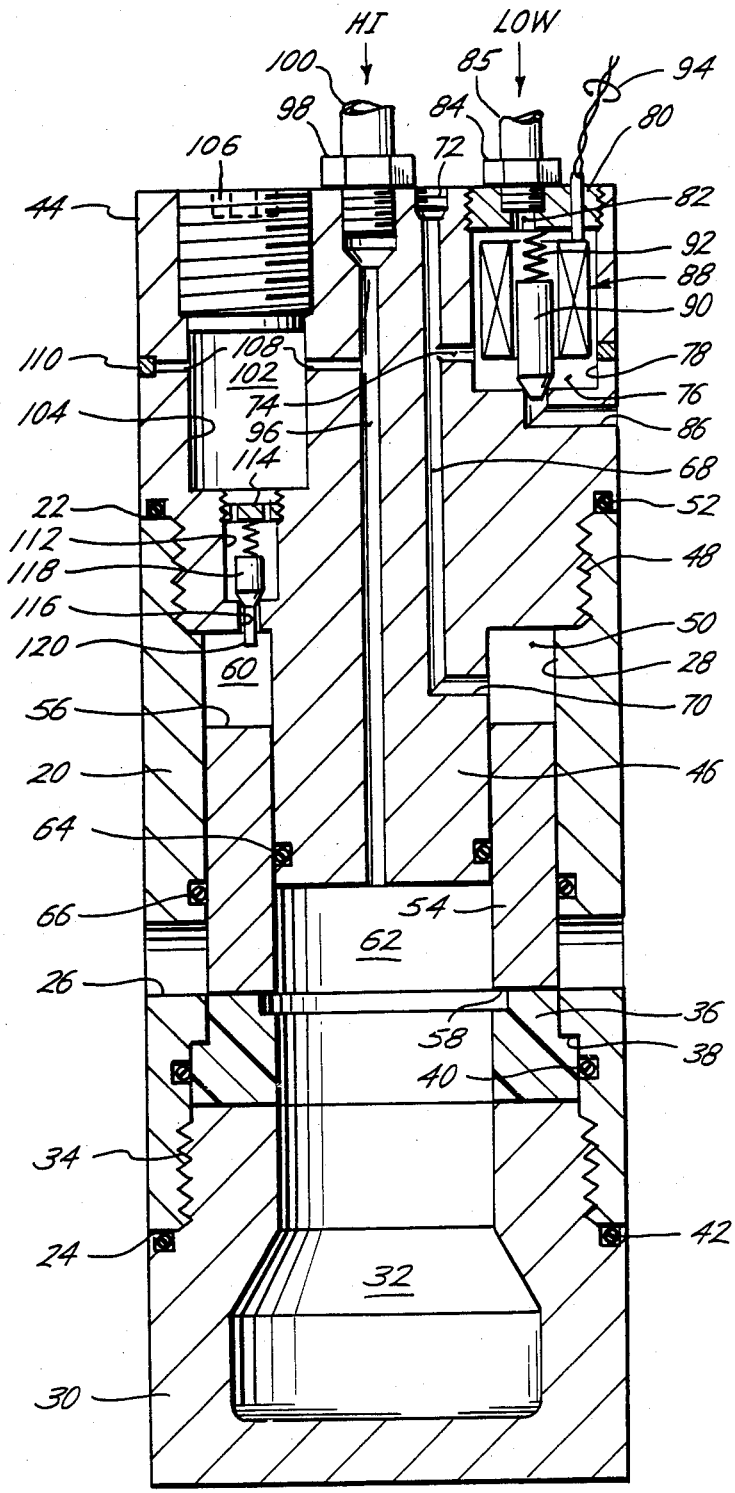
FIG. 2 is an elevational view of an acoustic source in cross section.

FIG. 2 is an elevational view in cross section of an acoustic source 12 such as an air gun. Air gun 12 may have a housing or casing 20 preferably made from stainless steel. Casing 20 has an upper and a lower end 22 and 24 respectively with at least one but preferably two or three exhaust ports 26 extending transversely therethrough at approximately the midsection. The casing 20 has a cylindrical inner wall 28 having a predetermined diameter and extending substantially along the entire length thereof.

The lower end 24 of the casing 20 may receive a cannister 30 having a chamber 32 of predetermined volume defined therein. The exterior of cannister 30 may be threaded at 34 so as to be coupled to and close the lower end of the casing 20. Disposed within casing 20 between cannister 30 and flush with the lowermost portion of the exhaust ports 26 may be an annular valve seat 36 having a substantially flat upper surface. Valve seat 36 is tightly held within casing 20 by cannister 30 urging the seat upward against a shoulder 38 the casing. Although not required, it is preferred that seat 36 be made of Delrin acetal resin manufactured by E. I. Dupont de Nemours and Co., Inc. An O-ring 40 forms at tight seal between the interior of casing 20 and the exterior of seat 36. A second O-ring 42 forms a substantially identical seal between casing 20 and cannister 30.

The upper end 22 of the casing 20 may receive an actuator head 44 having a plug 46 concentrically extending therefrom and extending substantially midway into the housing to approximately the uppermost surface of the exhaust ports 26. Head 44 may be threaded at 48 so as to tightly close the upper end of the casing. Although threads are shown to connect the cannister and head to the casing, it is understood that other techniques such as bands, clamps, and/or bolts may be used. The plug 46 extending from the head 44 may have a substantially reduced diameter than that of the inner wall 28 defining an annular chamber 50 therebetween. An O-ring 52 forms an air tight seal between the head 44 and the casing 20. A cylindrical-sleeve valve or shuttle 54 having an outside diameter substantially equal to that of inner wall 28 and an inside diameter substantially equal to plug 46, is concentrically disposed within casing 20 such that one end 56 is partially received within annular chamber 50 and the other end 58 is in contact with the upper surface of seat 36. A portion of the lower end 58 overhangs the inner upper lip of the seat 36. The upper end of the shuttle 54 forms one side of a control chamber 60 defined by the upper portion of the annular chamber 50. A firing chamber 62 is defined by the lower end of plug 46, shuttle 54, the inner diameter of ring 36, and chamber 32 in the cannister 30. The shuttle is in sliding relationship within the casing so that the exhaust ports 26 are closed with the lower end 58 of the shuttle 54 against the seat 36. Two O-rings 64 and 66 form inner and outer seals respectively on each side of the shuttle between the inner wall 26 and the plug 46.

The actuator head 44 contains a plurality of passages and chambers utilized in actuating the air gun 12. A low pressure passage 68 extends from the upper end of the head 44, terminating in a right angle intersection of a second passage 70 in fluid communication with the control chamber 60. The upper end of passage 68 is sealed by second plug 72. Passage 68 is also in fluid communication via conduit 74 with a dumping chamber 76 defined by a hole 78 extending from the top of the head 44 and closed by third plug 40. Dumping chamber 76 receives low-pressure fluid through a conduit 82, low-pressure fitting 84, and low-pressure line 85 coupled to and extending through a fourth plug 80. Dumping chamber 76 is also in fluid communication with the air gun exterior by way of passage 86 extending from the bottom of the chamber and turning at a right angle to the exterior. A solenoid-actuated poppet-valve 88 may be disposed within the dumping chamber 76 such that a solenoid plunger 90 is forced to block passage 86 by a spring 92. Electrical conductors 94 for the solenoid extend through plug 80 to a remote activated power source not shown.

Adjacent to low-pressure passage 68 and essentially parallel thereto may be a longitudinal high-pressure passage 96 extending through the head 44. The upper end of passage 96 receives a high-pressure fitting 98 coupled to the end of a high pressure line 100. The lower end of passage 96 exits the lower end of plug 46 and into the firing chamber 62.

A second and smaller high pressure chamber 102 is defined by a hole 104 extending into the top of head 44 and closed by a fifth plug 106. Chamber 102 may be in fluid communication with high-pressure passage 96 through a transversely penetrating conduit 108 extending from the air gun exterior, through chamber 102 and intersecting passage 96. Conduit 108 has a substantially lesser diameter than passage 96 and is sealed from the exterior by a sixth plug 110.

Defined in the bottom of chamber 102 is a concentric valve chamber 112 in fluid communication with chamber 102 through a perforated seventh plug 114 and also in fluid communication with control chamber 60 through conduit 116. A spring-biased poppet valve 118 within the valve chamber 112 closes conduit 116. A stem 120 of the poppet valve extends through conduit 116 and partially into the control chamber 60.

In operation, air gun 12 may be deployed in a body of water 16 at a predetermined depth. Low-pressure air is passed through low-pressure line 85 to dumping chamber 76. With the solenoid-actuated poppet valve 88 in the closed position, that is plunger 90 against passage 86, the air is forced through conduit 74, passages 68 and 70 and into the control chamber 60 until the desired pressure is reached. Simultaneously, high-pressure air is passed through high-pressure line 100, passage 96 and into the firing chamber 62. High-pressure air also passes from passage 96 through conduit 108 and into chambers 102 and 112, until the desired pressure is equalized between the firing chamber 62 and chambers 102 and 112.

The shuttle is preferred to be in the closed position initially and is maintained in the closed position because the force exerted upon the upper end 56 of the shuttle 54 by the air pressure within the control chamber 60 is greater than the force exerted upon the lower end 58 by the pressure in the firing chamber 62. That is because the surface area of the upper end 56 exposed to the pressure in the control chamber 60 is greater than the surface area of the lower end 58 exposed to the high pressure in the firing chamber 62, that is the amount overhanging seat 36.

The air gun is actuated by passing an electrical current through conductors 94 causing the solenoid plunger 90 to withdraw from passage 86, dumping a predetermined amount of air from the control chamber 60 through passages 68 and 86 to the exterior. The reduction in pressure within the control chamber 60 results in an imbalance of forces acting upon each end of the shuttle 54. The high pressure in the firing chamber 62 forces the shuttle upwards, thus allowing the high pressure air to act upon the full surface area of the lower end 58, thus thrusting the shuttle open. The high pressure air impulsively exits through the exhaust ports 26 to generate the desired acoustic pulse.

The upward movement of the shuttle is arrested when the shuttle travels above the point where conduit 70 enters the control chamber. The air trapped within the control chamber is compressed by the reduction in chamber volume, cushioning or slowing the upward motion of the shuttle. The upper end 56 of the shuttle 54 engages the stem 120 of the poppet valve 118, forcing it out of conduit 116. High pressure air from chamber 102 rushes through holes 112 and 116 into the control chamber, positively driving the shuttle 54 in the opposite direction. The poppet valve 118 closes, but the amount of high-pressure air injected into the control chamber is sufficient to force the shuttle 54 closed without shuttle rebound. The reduced diameter of conduit 108 restricts the amount of air wishing to flow towards the firing chamber 62 when shuttle 54 is opening.

For illustrative purposes, our invention has been described with a certain degree of specificity. Variations will occur to those skilled in the art but which may be included within the scope and spirit of this invention which is limited only by the appended claims.

We claim as our invention:

1. An apparatus for generating an acoustic pulse in a body of water, comprising:

(a) housing closed at each end and having at least one exhaust port defined therein;

(b) valve means disposed within said housing having a first and a second position for closing and opening said exhaust port;

(c) means under a first pressure within said housing for urging said valve means to said first position closing said exhaust port;

(d) means under a second pressure greater than said first pressure for urging said valve means to said second position, said means under said second pressure explosively exiting through said exhaust port and into said body of water to generate said acoustic pulse; and (e) means under said second pressure for urging said valve means from said second position back to said first position, closing said exhaust port.

2. An apparatus as recited in claim 1, wherein said means under said second pressure for urging said valve means from said second position back to said first position comprises:

(a) a third conduit placing said second pressure source in fluid communication with said first chamber; and (b) a poppet valve disposed within said third conduit and partially extending into said first chamber in a first position closing said third conduit so that said valve means in said second position opens said poppet valve providing said fluid under said second pressure to said first chamber and urge said valve means to said first position, closing said exhaust port.

3. An apparatus as defined in claim 1, wherein said means for closing and opening said exhaust port comprises a sleeve valve slidably disposed within said housing, said sleeve valve dividing said housing into a first and a second chamber.

4. An apparatus as defined in claim 3, wherein said means under said first pressure for urging said valve means to said first position comprises:

(a) a first pressure source providing a first fluid; and (b) a first conduit in fluid communication with said first pressure and said first chamber in said housing.

5. An apparatus as recited in claim 4, wherein said means under said second pressure for urging said valve means to said second position comprises:

(a) a second pressure source providing a second fluid;

(b) a second conduit in fluid communication with said second pressure source and said second chamber in said housing.

* * * * *